(12) United States Patent
Weiss

(10) Patent No.: US 10,569,325 B2
(45) Date of Patent: Feb. 25, 2020

(54) PISTON OF AN INTERNAL COMBUSTION ENGINE HAVING ALKALI METAL COOLING AND METHOD FOR PRODUCTION THEREOF

(71) Applicant: KS Kolbenschmidt GmbH, Neckarsulm (DE)

(72) Inventor: Eberhard Weiss, Langenbrettach (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 75 days.

(21) Appl. No.: 15/754,601

(22) PCT Filed: Aug. 29, 2016

(86) PCT No.: PCT/EP2016/070323
§ 371 (c)(1),
(2) Date: Feb. 23, 2018

(87) PCT Pub. No.: WO2017/032905
PCT Pub. Date: Mar. 2, 2017

(65) Prior Publication Data
US 2018/0243817 A1    Aug. 30, 2018

(30) Foreign Application Priority Data
Aug. 27, 2015   (DE) .................. 10 2015 216 422

(51) Int. Cl.
F02F 3/18     (2006.01)
B21K 1/18    (2006.01)
B23P 15/10  (2006.01)
F02B 23/06   (2006.01)

(52) U.S. Cl.
CPC .............. *B21K 1/185* (2013.01); *B23P 15/10* (2013.01); *F02F 3/18* (2013.01); *F02B 23/0603* (2013.01)

(58) Field of Classification Search
CPC ...................................... F02F 3/16; F02F 3/18
See application file for complete search history.

(56) References Cited

U.S. PATENT DOCUMENTS

| | | | | |
|---|---|---|---|---|
| 1,678,957 A * | 7/1928 | Philipp | .................... | F02F 3/18 |
| | | | | 123/41.16 |
| 3,516,335 A * | 6/1970 | Fangman | .............. | F02F 3/0015 |
| | | | | 92/176 |
| 3,609,840 A * | 10/1971 | Canady | .................... | F02F 3/18 |
| | | | | 29/888.045 |
| 9,127,619 B2 * | 9/2015 | Lineton | .................... | F02F 3/16 |
| 10,294,887 B2 * | 5/2019 | Matsuo | .................... | B05D 5/00 |
| 2008/0060514 A1 | 3/2008 | Scharp | | |
| 2014/0123930 A1 | 5/2014 | Lineton et al. | | |

FOREIGN PATENT DOCUMENTS

| | | |
|---|---|---|
| DE | 102013002895 A1 | 8/2014 |
| EP | 0086284 A1 | 8/1983 |
| JP | 2006152879 A | 6/2006 |
| WO | 2014012531 A1 | 1/2014 |

* cited by examiner

*Primary Examiner* — Thomas E Lazo
(74) *Attorney, Agent, or Firm* — Young Basile Hanlon & MacFarlane, P.C.

(57) ABSTRACT

The invention discloses a method for producing an internal combustion engine piston having at least one cavity which is filled with an alkali metal cooling medium and is subsequently closed. The at least one cavity longitudinally extends from a central point into the piston body toward the piston circumference. The invention further discloses a piston produced according to the method.

19 Claims, 5 Drawing Sheets

PRIOR ART

PISTON OF AN INTERNAL COMBUSTION ENGINE HAVING ALKALI METAL COOLING AND METHOD FOR PRODUCTION THEREOF

TECHNICAL FIELD

The invention relates to a piston and a method for the production of a piston of an internal combustion engine which has closable cavities in which a cooling medium, in particular, an alkali metal, in particular sodium, is incorporated.

BACKGROUND

DE 10 2013 002 895 A1 relates to a piston for a reciprocating piston internal combustion machine with a piston shaft, with a piston crown having a circumferential ring part, in which piston crown an at least partially circumferential cooling duct for receiving a cooling medium is provided, and with at least one duct element extending partially in the piston shaft and partially in the piston crown, wherein the at least one duct element is fluidically separated from the cooling duct, wherein a second cooling medium which is different from the first cooling medium for cooling of the piston at least in regions is received in the duct element. In order to avoid an undesirable escape of the liquid sodium out of the respective duct element, it is proposed here to close the respective opening with a ball. This is very complex and therefore costly. The imperviousness of each individual closure element must furthermore be ensured in order to prevent an undesirable escape of alkali metal into the combustion chamber of the internal combustion engine.

The chambers into which the alkali metal is incorporated are formed as duct-shaped elements which have a straight profile and extend in a skewed manner to one another. This means that the axes of the duct elements do not meet at any point within the piston as a result of the skewed arrangement to one another so that a separate closure element is also required for each duct element, as a result of which its mounting outlay is increased.

Hitherto, pistons had a plurality of deep bore holes coming from the shaft side, which deep bore holes have to be bored in a very complicated fashion (oblique countersinking and boring). Each bore was closed individually in a complex fashion. The closure was embodied as fit and closed with a weld seam as a result of the requirement to be gas-impervious. Such bores were often created manually as a result of the complexity.

SUMMARY

The object on which the invention is based is to improve a generic piston and a method for producing such a piston.

In terms of the method for producing a piston, the object is achieved in that at least two cavities are incorporated into the piston from a central point of the piston and the cavities are closed after filling in of the cooling medium in the region of the central point. As a result of this, the advantage is achieved that a plurality of cavities, for example, two, three or more than three cavities are incorporated into the piston, in particular into the solid material of the piston from a central point. It is not necessary to start at various points of the piston in order to incorporate these cavities, for example, by a boring process. The key advantage is furthermore achieved that only a single closure process must be carried out after the incorporation of the cavities and the filling in of the cooling medium. It is thus not necessary to provide a closure process for each individual cavity, once this has been filled with cooling medium. Advantages also arise for the filling process since this can be carried out from the central point, for example, simultaneously for all of the cavities incorporated from there. This means that, after incorporation of the cavities in the piston, filling of these cavities can be carried out in one process and closing of this central point can be carried out in a further single process.

The cavities are preferably incorporated into the piston by a boring or milling process. In this case, they are configured as longitudinal cylindrical cavities. It is also conceivable to already incorporate the cavities into a piston blank with production of the piston, e.g. using a casting process. In this case, the cavities already incorporated with the production of the piston can also be formed to be longitudinal (in turn e.g. cylindrical). They can, however, also have a different form, e.g. a curved form in their profile, which can be realized by corresponding shaping of a flushable core for the production of such a cavity using the casting method. In such a case, the location and arrangement of the cavities can be very well adapted to the geometric properties of the piston.

In a particularly advantageous manner, the cavities, as already known from the prior art, are filled with an alkali metal, in particular sodium. This can be carried out according to the invention in a particularly advantageous manner from the central point simultaneously for all the incorporated cavities. It is also conceivable that the cooling medium is not filled directly into the incorporated cavities, but rather that the cooling medium is filled in a container (e.g. a small tube) and this container is already closed in a gas-impervious manner with respect to the external surroundings. After production of such a container, such as e.g. the small tube with filled-in sodium, this component is inserted into a respective cavity from the central point. After insertion of these containers with cooling medium into the existing cavities, these can be closed in the region of the central point. If a separate closure element is used for this purpose, as a result, the position of the containers in the cavities can also be fixed so that they can no longer move relative to the piston. It is alternatively also possible to think of embodying closing, for example, with a closure element so that the containers located in the cavities are permitted a certain degree of to and fro movement in the piston.

There are several possibilities in terms of closing. Either a separately manufactured closure element is fixed in the region of the central point, preferably undetachably to the piston, further preferably undetachably fixed in the region of the combustion chamber bowl, further preferably rotationally symmetrically to a piston stroke axis. It is also conceivable to realize the closure with the aid of piston material, in particular by means of soldering, welding or gluing or the like.

It is furthermore provided according to the invention that the central bore is embodied in the region of a later combustion chamber bowl. The central bore can then be placed, for example, in a central elevation of the later combustion chamber bowl. This central elevation can be carved out from a closure element for the central bore.

It is furthermore provided according to the invention that the plurality of cavities are incorporated into the piston in such a manner that the axes of the plurality of cavities intersect at a common point in a central region. As a result of this, it is ensured that the plurality of cavities have the same inclination. The plurality of cavities are inclined in relation to a piston stroke axis of the piston. The common point of the intersecting axes of the cavities can lie, for example, on the piston stroke axis. The inclination of the axes of the cavities is preferably carried out in relation to the piston stroke axis in the direction of the piston shaft. An inclination of the axes of the cavities in relation to the piston stroke axis in the direction of a ring field of the piston is also conceivable.

It is furthermore provided according to the invention that the central bore is closed with a closure element having a corresponding geometry. As a result of this, it is ensured that the cavities coming from the central bore are securely closed in a gas-impervious manner. The advantage furthermore arises that the closure element which is produced separately from the piston can be adapted precisely to the geometry of the central point, as a result of which the closure process is facilitated. As a result of the corresponding geometry of the closure element with the geometry of the central point, the separate closure element can be very easily used not only in the region of the central point, but rather can also be jointed undetachably, e.g. by means of welding, soldering, gluing or the like. This undetachable joining together of piston and separate closure element then has precisely the advantage if the central point is located in the region of the combustion chamber bowl which is reworked after joining together by finishing, for example, a machining process.

It is furthermore provided according to the invention that both the central bore and the closure element have a lateral surface of a truncated cone. The configuration as a lateral surface of a truncated cone is particularly expedient since it expands in a funnel-shaped manner and thus facilitates incorporation of the at least one cavity for receiving a cooling medium. In this case, the base surface of the truncated cone can be oriented both in the direction of the later combustion chamber bowl and in the direction of the piston bolt bores, depending on the inclination intended for the cavities. If the inclination of the cavities is supposed to be embodied in the direction of the shaft or the piston bolt bores, the base surface of the truncated cone is oriented in the direction of the piston base. The closure element is supplied from the direction of the piston base. If, however, the inclination of the cavities is supposed to be embodied in the direction of the ring field or the optional cooling duct, the base surface of the imaginary truncated cone is oriented in the direction of the piston bolt bores. In this case, the closure element is supplied from the direction of the piston bolt bores.

It is furthermore provided according to the invention that the central bore is closed in a non-positive, positive and/or firmly bonded manner with the closure element, in particular by a friction welding method. The choice of the method for jointing the closure element is dependent on its geometric configuration. In so far as the closure element and the corresponding central bore are embodied to be rotationally symmetrical, friction welding is expedient for the production of a firmly bonded connection. Handling surfaces are provided on the upper part of the closure element, said handling surfaces serving in the case of the friction welding method to transmit the torque to the closure element. After carrying out the friction welding method, these handling surfaces and any friction welding beads which arise can be removed, for example, to create a combustion chamber bowl. However, one may only remove as much material as required to ensure the gas-impervious closure of the at least one cavity. It must be ensured that no alkali metal escapes from the at least one cavity.

In terms of the piston, the object is achieved according to the invention in that at least two cavities extend into the piston from a central point of the piston and the cavities are closed in the region of the central point after filling in of the cooling medium. As a result of this, the same advantages arise as have already been described further below in relation to the production method. In particular, the advantages arise that the plurality of cavities can only be incorporated into the piston from one point. Moreover, filling of the cavities with the cooling medium can also be carried out from this central point directly or with the aid of a container. The key advantage furthermore arises, as already described, that the plurality of cavities can be closed in a gas-impervious manner in a single method step after filling of the cavities with the cooling medium. Closure is carried out, as also already described, by a separate closure element or by soldering, welding, filling with further material or the like of the central point.

In this case, the inclination of the at least one cavity in relation to the piston stroke axis of the piston is carried out either in the direction of the piston shaft or the piston bolt bores or in the direction of the ring field or the optional radially circumferential cooling duct. In both cases, combustion heat is discharged from the central region of the piston base via the cooling medium present in the at least one cavity. Heat is preferably discharged from the region of the combustion chamber bowl via the cooling medium in the at least one cavity.

It is furthermore provided according to the invention that the at least one cavity does not penetrate through an outer surface of a piston shaft of the piston. As a result of this, the outer surface, which is under particularly high load, of the piston shaft is kept free from mechanical or electrochemical damage. The outer surface of the piston shaft is maintained as an even surface.

It is furthermore provided according to the invention that at least two cavities are provided and that the axes of the at least two cavities intersect at a common point in a central region. As a result of this, the axes of the at least two cavities lie on the lateral surface of an imaginary cone. The axes of the cavities and thus also the cavities have an identical inclination. The cooling medium can move in the region with the same inclination in relation to the piston stroke axis.

It is furthermore provided according to the invention that the central bore is closed by a closure element with corresponding geometry. As a result of this, a firm fit of the closure element in the central bore is achieved. The closure element is preferably embodied to be play-free in relation to the central bore.

In other words, the object set above is achieved in that a central region is created in a region of the piston and two or more longitudinally extending openings are incorporated into the piston base body starting from this central region. After the incorporation of these openings, chambers are created which are filled with a cooling medium, in particular an alkali metal, furthermore in particular sodium. The closure of the central region from which the openings extend is subsequently carried out by a joint closure element, i.e. the closure element which closes all the openings. The closure element is connected undetachably to the piston base body with a suitable method, such as, for example, welding, soldering, gluing, jamming, clipping, in particular friction welding.

The axes of the longitudinally extending receiving chambers for the cooling medium intersect at a common central point which is located in the central region from which the openings proceed. This has the advantage that the openings can not only be filled jointly with the cooling medium, but that the closure of the individual openings is carried out jointly by a single closure element. The closure element can be, but does not have to be a component of the finished piston. The closure element is preferably part of the combustion chamber bowl of a piston, in particular the central bump-like elevation of the combustion chamber bowl base.

In other words, joint closure of a plurality of bored cooling chambers on an internal combustion engine piston is proposed. As a result of this, a central closure of cooling bores which move the heat from the combustion region into a cooler region of the piston with an additional medium.

The invention is characterized in that the bores are not, as known from the prior art, bored from the shaft, but rather are bored via a central surface created in the center of the piston base. As a result of this reversal of the processing direction, it is possible to carry out very precise positioning of the bore. Complex oblique countersinking and boring from the shaft side is also dispensed with. Efficient and low-cost industrialization is thus achieved for this bore.

As a result of this, multiple processing and multiple closure of the individual bores are not necessary. Complex, oblique pre-processing is furthermore dispensed with. Instead, precise positioning of the bores is carried out since the start of the bore is at the point at which the bore must be very exact. Boring is carried out into a previously processed surface which is aligned at a right angle to the bore axis. The central closure of several bores is carried out simultaneously via a jointing method.

The invention is characterized in that a plurality of bores can be closed by a central closure in the piston center. By reversing the processing direction, precise positioning of the bore and thus an optimum cooling action are possible. As a result of the processed surface aligned at a right angle to the bore axis, it is possible to carry out low-cost processing. Since, in the case of the invention, a plurality of bores are simultaneously closed by a jointing process, multiple testing for imperviousness or complicated rotation of the component is not necessary. The central closure can be jointed with all of the jointing processes which can be technically implemented and are currently known, for example, soldering, gluing, friction welding, welding or the like.

A central closure of all the bores is only possible by reversing the processing direction.

The lower portion of the closure element can be embodied, for example, as a cone or truncated cone.

Further geometric configurations are also conceivable for the closure element, but with the prerequisite that they are embodied in the covering region corresponding with the surface of the central bore.

The free end regions of the cooling chambers meet in the region of the central point which can also be referred to as a central bore (if they are incorporated into the piston by a boring process) or as a central opening (if they are incorporated, for example, by a milling process or in another manner into the piston).

The cooling medium is preferably an alkali metal. Other suitable cooling media in addition to alkali metals may also, however, be considered.

The fundamental idea is explained below on the basis of the figures. Further details of the invention are described in the figures on the basis of a schematically represented exemplary embodiment.

Figure 1:
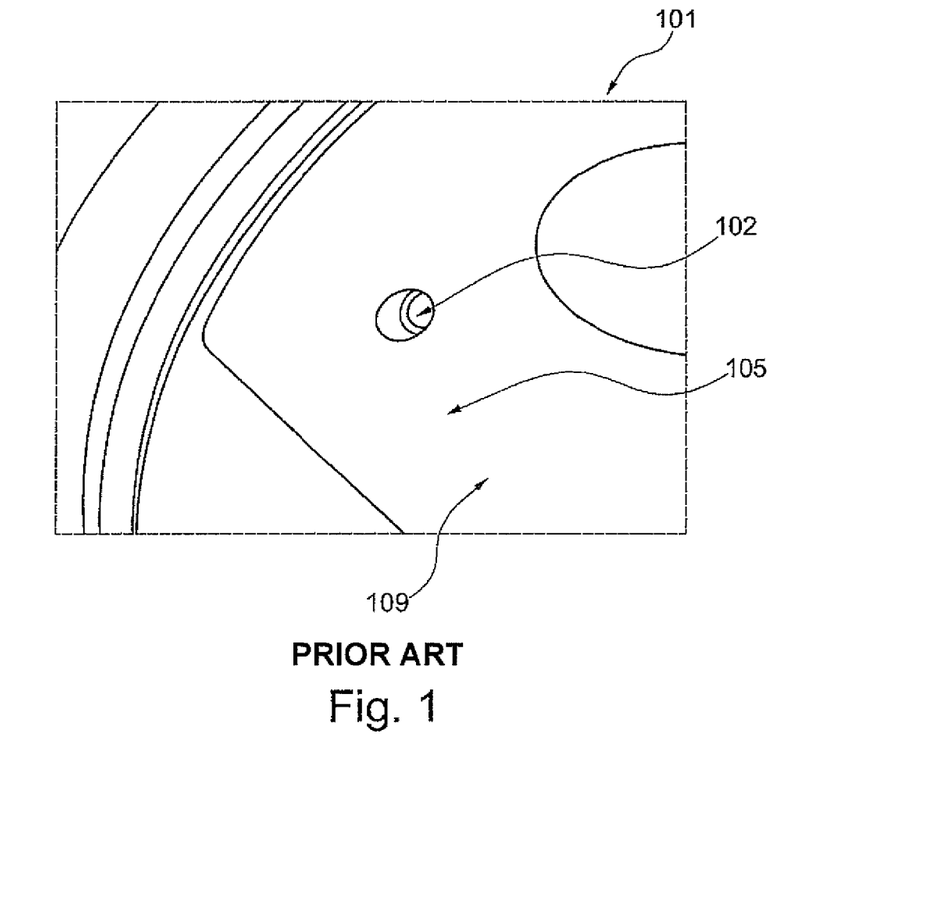
FIG. 1 shows a lower view of a piston with a deep drill hole for receiving alkali metal from the prior art.

FIG. 1 shows a lower view of a piston 101 with a deep drill hole 102 for receiving alkali metal from the prior art. Each individual deep drill hole 102 must be countersunk and deep bored (to be carried out in the case of each individual bore). A bore 102 rotated in two directions in the region of forging skin 105 of a shaft 109 is represented.

Figure 2:
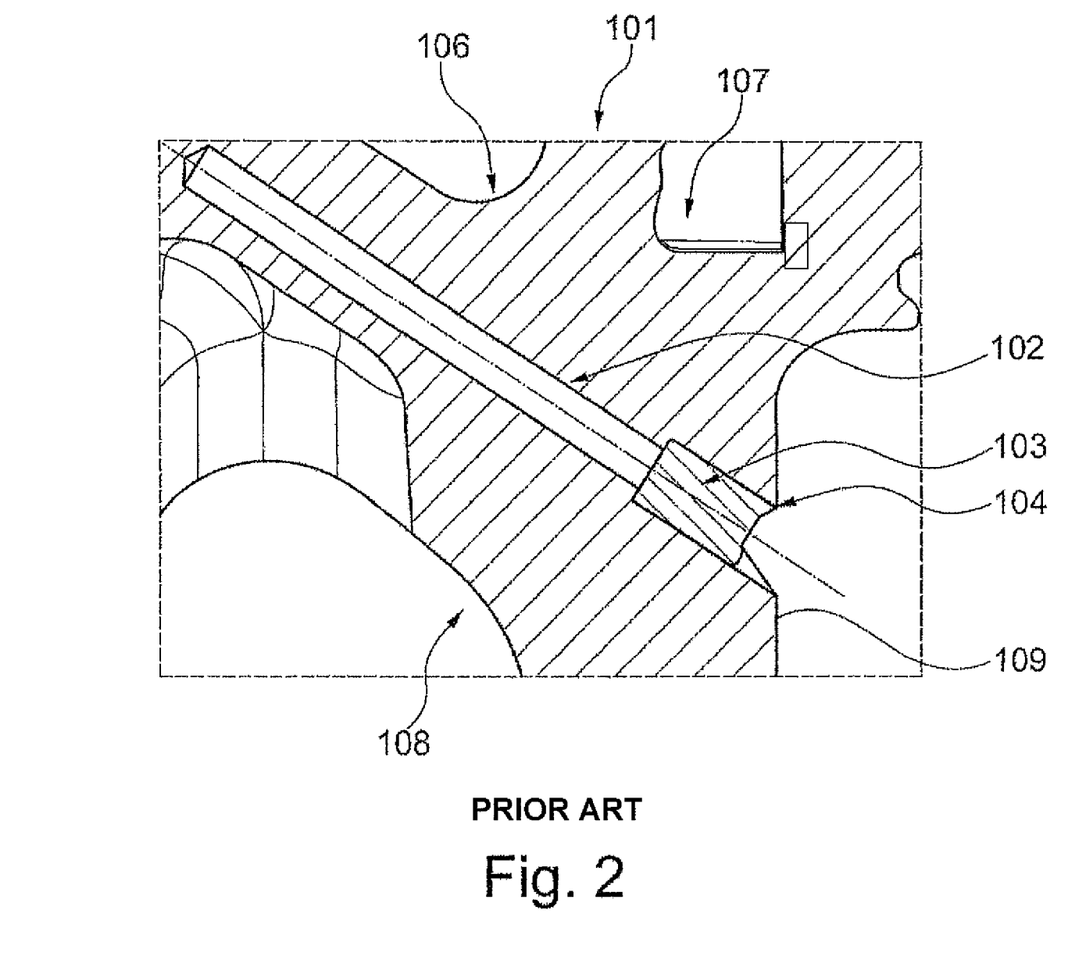
FIG. 2 shows a sectional view of a piston with a deep drill hole which is closed according to the prior art for receiving alkali metal.

FIG. 2 shows a deep drill hole 102 closed according to the prior art for receiving alkali metal. Deep drill hole 102 is closed by a closure plug 103 in a piston 101 from the prior art, which closure plug is fixed by a weld seam 104. Piston 101 furthermore has a combustion chamber bowl 106 as well as a cooling duct 107 and a bolt bore 108. Deep drill hole 102 is not connected to cooling duct 107. The deep drill hole is incorporated into piston 101 from the direction of shaft 109.

Figure 3A:
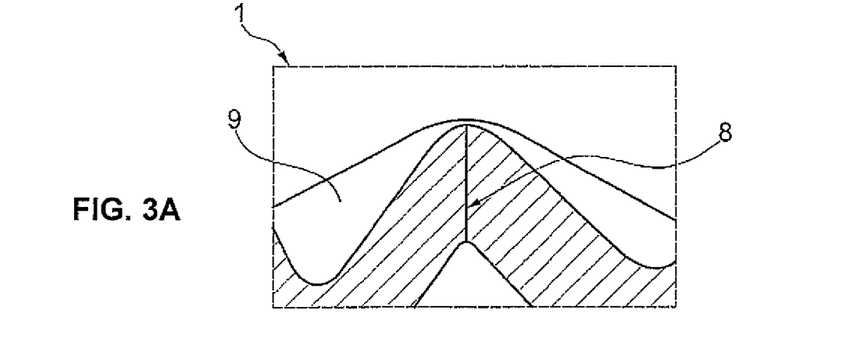
FIGS. 3A to 3C show the sequence for incorporation of the cavity according to the invention for alkali metal into a piston.
Figure 3B:
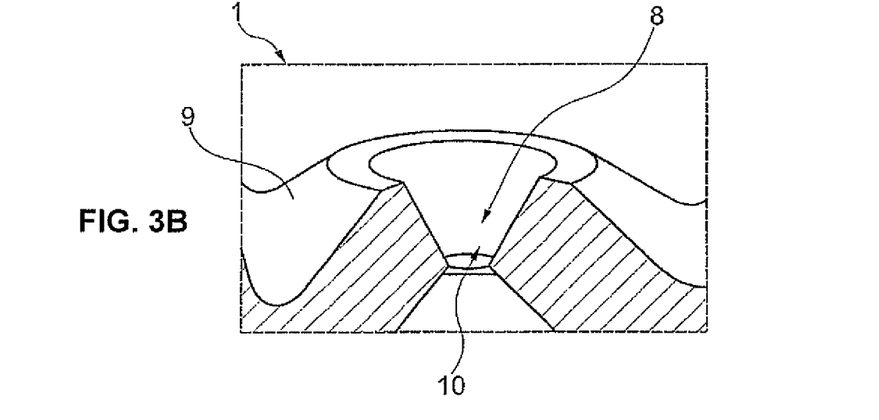
Figure 3C:
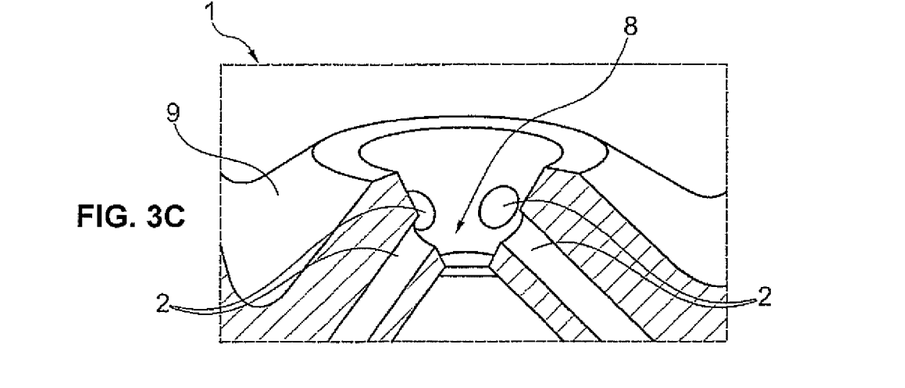

FIGS. 3A to 3C show the sequence for incorporating a cavity 2 according to the invention for receiving alkali metals into a piston 1.

FIG. 3A shows the preprocessed blank in the supplied state.

FIG. 3B shows a preprocessed central point 10 (in particular bored or milled). Said central point 10 is incorporated into a central region 8 (which penetrates through the piston stroke axis) of piston 1. Central region 8 lies within a later combustion chamber bowl 6. Central point 10 can have, for example, the configuration of a truncated cone, other geometrical forms also, however, being conceivable. The rotationally symmetrical surface which delimits central point 10 is embodied here as a lateral surface of a truncated cone.

FIG. 3C shows cooling bores incorporated at a right angle to preprocessed point 10 for formation of a cavity 2 which serves to receive alkali metal. It forms a reservoir for alkali metal.

Figure 4A:
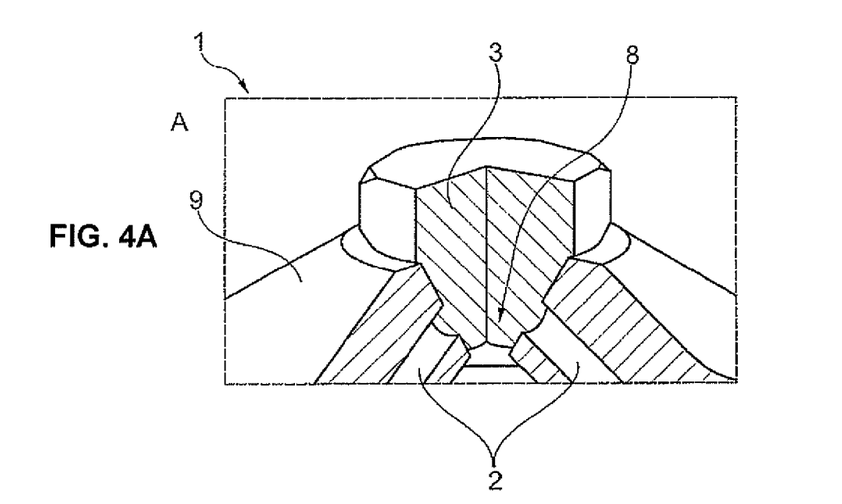
FIGS. 4A and 4B show the creation of a closure according to the invention for the cavity for receiving alkali metals.
Figure 4B:
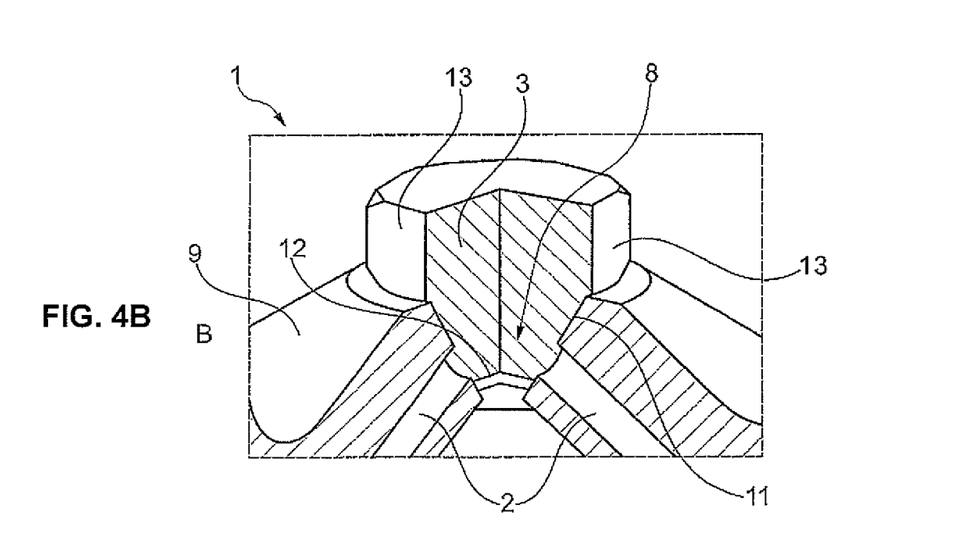

FIGS. 4A and 4B show the creation of a closure according to the invention of cavity 2 for alkali metals. The closure of the at least one cavity 2 is carried out by a closure element 3. Said closure element 3 can be embodied as a truncated cone. It is important that closure element 3 has a corresponding geometry to central point 10. It is advantageous if both central point 10 and closure element 3 have a rotationally symmetrical configuration since this significantly simplifies jointing. For example, a friction welding method can be provided as a firmly bonded jointing method. Closure element 3 is fixed to the piston in a firmly bonded and/or non-positive and/or positive manner Fixing of closure element 3 is preferably carried out in the region of central point 10. A lateral surface 11 in the lower region of closure element 3 is integrated positively into the lateral surface of central point 10. A covering surface 12 of the truncated cone-shaped portion of closure element 3 adjoins facing away from combustion chamber bowl 6. Its base surface is located at that end of the truncated cone-shaped portion of closure element 3 which is opposite covering surface 12. The upper region of closure element 3 which has a plurality of handling surfaces 13 on its circumference adjoins this base surface. Said handling surfaces 13 serve to securely receive closure element 3 in tools. If, for example, a friction welding process is used in order to fix closure element 3 undetachably in central point 10, the necessary torque can be transmitted via handling surfaces 13. In the case of later completion of piston 1, these handling surfaces 13 can be removed. Six handling surfaces 13 are preferably distributed evenly on the circumference of the upper region of closure element 3. In this case, a hexagonal bolt drive can be used to actuate closure element 3. It is, however, also conceivable to provide fewer handling surfaces 13 on closure element 3, for example, three or four or more handling surfaces 13 on closure element 3, for example, eight.

The jointing of central closure element 3 by friction welding is shown in FIG. 4A. A possible friction welding bead is formed on the circumference of the truncated cone-shaped portion of closure element 3 in the region of its base surface and/or its covering surface. In the region of the base surface of the truncated cone-shaped portion, the friction welding bead can be removed during completion of combustion chamber bowl 6, for example, by machining methods. In the same method step, the upper region of closure element 3 with handling surfaces 13 can also be changed in terms of its geometrical configuration or entirely removed.

FIG. 4B in turn shows the jointing of central closure element 3 by soldering, gluing, welding or the like. It is also conceivable to embody a thread between closure element 3 and central point 10. In this case, threads are machined into lateral surface 11 of closure element 3 and into the lateral surface of central point 10. The handling surfaces in the upper region of closure element 3 then serve to actuate this screw connection.

Figure 5:
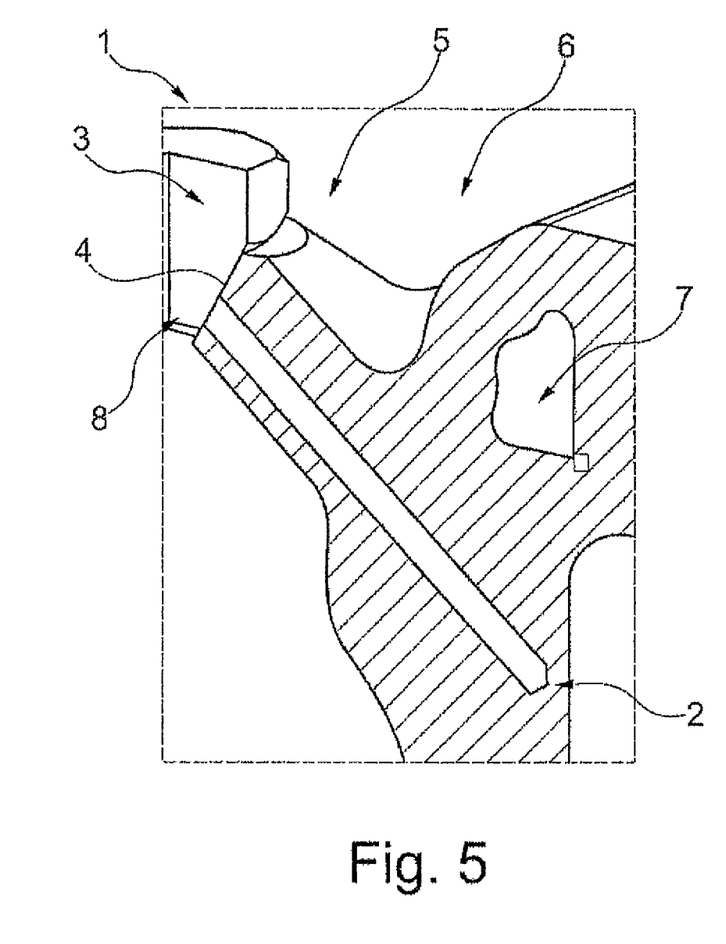
FIG. 5 shows a cut-out of the piston with a closed cavity for alkali metals.

A cut-out of piston 1 with a closed cavity 2 for alkali metals is shown in FIG. 5. The multiple complex closure of individual deep drill holes is dispensed with as a result of the central closure with closure element 3. A forging skin 5, which, however, does not have to be penetrated for production of the at least one cavity 2 is formed in the region of combustion chamber bowl 6. A radially circumferential cooling duct 7 is furthermore represented. Said cooling duct 7 receives a different cooling medium than is used in the at least one cavity 2. As a result of the spatial separation, it is ensured that no mixing through of the at least two cooling media (in particular oil and sodium) takes place.

The at least one cavity 2 is generated by a bore into a processed surface defined at a right angle to the bore axis (no separate spot facing required). The complex preparation for deep drill holes is dispensed with. No boring through a forged blank contour is furthermore required.

LIST OF REFERENCE NUMBERS

1 Piston
2 Cavity
3 Closure element
4 Weld seam
5 Forging skin
9 Combustion chamber bowl
7 Cooling duct
8 Central region
9 Piston base body
10 Central point
11 Lateral surface
12 Covering surface
13 Handling surface
101 Piston from the prior art
102 Deep drill hole
103 Closure plug
104 Weld seam
105 Forging skin
106 Combustion chamber bowl
107 Cooling duct
108 Bolt bore
109 Shaft

The invention claimed is:

1. A method for the production of a piston (1) of an internal combustion engine, wherein at least one cavity (2) is formed in the piston (1), wherein the at least one cavity (2) is filled with a cooling medium alkali metal, and is subsequently closed, wherein the at least one cavity comprises forming at least two cavities (2) from a central point (10) of the piston (1), the central point in communication with a combustion chamber bowl (6); and closing the at least two cavities (2); after filling the at least two cavities with the cooling medium alkali metal in the region of the central point (10).

2. The method claim 1 wherein the at least two cavities (2) each comprise an axis that intersect at a common point in a central region.

3. The method of claim 1 wherein the central point (10) is formed through one of boring a hole or milling.

4. The method of claim 1 wherein the central point (10) is closed with a closure element (3) having corresponding geometry to the central point.

5. The method of claim 4 wherein each of the central point (10) and the closure element (3) comprise a lateral surface of a truncated cone.

6. A piston (1) of an internal combustion engine, wherein the piston (1) has at least one closed cavity (2) which is filled with a cooling medium alkali metal, and subsequently closed, wherein the at least one closed cavity comprises at least two cavities (2) each extending into the piston (1) from a central point (10) of the piston (1) defining one of a central bore or a central opening in communication with a combustion chamber bowl (6); and the at least two cavities (2) are closed in a region of the central point (10) after filling in of the cooling medium alkali metal.

7. The piston (1) of claim 6 wherein the at least two cavities (2) do not penetrate through an outer surface of a piston shaft of the piston (1).

8. The piston (1) of claim 6 wherein each of the at least two cavities (2) comprise an axis, the axes intersecting at a common point in a central region including the central point (10).

9. The piston (1) of claim 6 wherein the central point (10) one of the central bore or the central opening and the at least two cavities (2) are closed by a closure element (3) having a corresponding geometry to the central point (10).

10. The piston (1) of claim 9 further comprising a cooling duct operative to receive a first cooling medium, the cooling medium alkali metal comprising a second cooling medium, wherein the closure element closes the at least two cavities preventing communication between the first cooling medium and the second cooling medium.

11. The piston of claim 6 wherein the one of the central bore or the central opening is defined by a lateral surface (11), each of the at least two cavities having a respective axis perpendicular to the lateral surface.

12. The piston of claim 6 further comprising a container for each of the at least two cavities, each container positioned within a respective of the at least two cavities and operable to contain the cooling medium alkali metal.

13. A method for the production of a piston for use in an internal combustion engine, the method comprising:

forming a central point defining one of a central bore or a central opening in a piston blank, the one of the central bore or the central opening in communication with a combustion chamber bowl;

forming at least two cavities in communication with the central bore, each of the at least two cavities having an axis, each of the at least two cavity respective axis intersecting at a common point positioned in a central region and the one of the central bore or the central opening;

filling the at least two cavities with an alkali metal cooling medium; and closing the one of the central bore or the central opening and the at least two cavities with a single closure element thereby preventing the alkali metal cooling medium in each of the at least two cavities from exiting the respective cavity.

14. The method of claim 13 wherein forming the central point one of the central bore or the central opening further comprises forming the one of the central bore or the central opening having truncated cone lateral side walls, the closure element having corresponding truncated cone lateral side walls.

15. The method of claim 13 wherein the filling of the at least two cavities comprises simultaneously filling the at least two cavities with the alkali metal cooling medium from the central point.

16. The method of claim 13 further comprising the steps of:

forming a cooling duct in the piston (1) for receipt of a first cooling medium, the cooling medium alkali metal defining a second cooling medium, wherein closing the central bore and the at least two cavities prevents communication between the first cooling medium and the second cooling medium.

17. A method for the production of a piston (1) of an internal combustion engine, wherein at least one cavity (2) is formed in the piston (1), wherein the at least one cavity (2) is filled with a cooling medium alkali metal, and is subsequently closed, wherein the at least one cavity comprises forming at least two cavities (2) from a central point (10) of the piston (1) comprising a lateral surface of a truncated cone; and closing the at least two cavities (2) with a closure element (3) having a corresponding geometry lateral surface to the central point through friction welding of the closure element (3) lateral surface to the center point lateral surface; after the filling in of the cooling medium alkali metal in the region of the central point (10).

18. A method for the production of a piston for use in an internal combustion engine, the method comprising:

forming a central point defining a central bore in a piston blank, the central bore having truncated cone lateral side walls;

forming at least two cavities in communication with the central bore, each of the at least two cavities having an axis, each of the at least two cavity respective axis intersecting at a common point positioned in a central region;

filling the at least two cavities with an alkali metal cooling medium; and closing the central bore with a single closure element having corresponding truncated cone lateral sidewalls through friction welding the closure element lateral sidewalls to the central bore lateral side walls, the closing thereby preventing the alkali metal cooling medium in each of the at least two cavities from exiting the respective cavity.

19. A method for the production of a piston for use in an internal combustion engine, the method comprising:

forming a central point defining a central bore in a piston blank;

forming at least two cavities in communication with the central bore, each of the at least two cavities formed as elongate cylindrical cavities starting from a cavity opening at the central point and extending the cavities toward an outer circumference of the piston, each cavity having a closed end opposite the cavity opening at the central point, each of the at least two cavities having an axis, each of the at least two cavity respective axis intersecting at a common point positioned in a central region;

filling the at least two cavities with an alkali metal cooling medium; and closing the central bore with a single closure element thereby preventing the alkali metal cooling medium in each of the at least two cavities from exiting the respective cavity.

* * * * *